(12) United States Patent
Nickel

(10) Patent No.: US 11,643,277 B2
(45) Date of Patent: May 9, 2023

(54) LINEAR MOTOR SYSTEM AND OPERATING METHOD FOR THE SAME

(71) Applicant: Schneider Electric Industries SAS, Rueil-Malmaison (FR)

(72) Inventor: Juergen Nickel, Waldbuettelbrunn (DE)

(73) Assignee: Schneider Electric Industries SAS, Rueil-Malmaison (FR)

( * ) Notice: Subject to any disclaimer, the term of this patent is extended or adjusted under 35 U.S.C. 154(b) by 0 days.

(21) Appl. No.: 17/445,517

(22) Filed: Aug. 20, 2021

(65) Prior Publication Data
US 2022/0055841 A1 Feb. 24, 2022

(30) Foreign Application Priority Data
Aug. 21, 2020 (EP) .................................... 20305942

(51) Int. Cl.
| | |
|---|---|
| *B65G 23/23* | (2006.01) |
| *H02K 41/03* | (2006.01) |
| *B65G 54/02* | (2006.01) |
| *H02K 11/21* | (2016.01) |
| *G01G 19/04* | (2006.01) |
| *G01G 19/08* | (2006.01) |

(52) U.S. Cl.
CPC ............. *B65G 23/23* (2013.01); *B65G 54/02* (2013.01); *G01G 19/04* (2013.01); *H02K 11/21* (2016.01); *H02K 41/03* (2013.01); *G01G 19/08* (2013.01)

(58) Field of Classification Search
CPC ........ B65G 54/02; B65G 23/23; H02K 41/03; H02K 41/031; H02K 11/21; G01G 19/00; G01G 19/002; G01G 19/04; G01G 19/042; G01G 19/08; G01G 19/086

USPC ......................................................... 198/805
See application file for complete search history.

(56) References Cited

U.S. PATENT DOCUMENTS

| | | | |
|---|---|---|---|
| 5,582,107 A | 12/1996 | Nozaki | |
| 10,128,733 B2 | 11/2018 | Prussmeier et al. | |
| 10,243,441 B2* | 3/2019 | Jacobs | ................. H02K 41/031 |
| 10,608,469 B2* | 3/2020 | Floresta | ................ B60L 15/007 |

(Continued)

FOREIGN PATENT DOCUMENTS

| | | |
|---|---|---|
| DE | 10 2014 117 200 A1 | 5/2016 |
| EP | 2 156 979 A1 | 2/2010 |

(Continued)

OTHER PUBLICATIONS

"Flying Motion: XPlanar," Beckhoff, 2018, 28 pages.

*Primary Examiner* — James R Bidwell
(74) *Attorney, Agent, or Firm* — Oblon, McClelland, Maier & Neustadt, L.L.P.

(57) ABSTRACT

A linear motor system, in particular to a transport system, e.g. a multi-carrier, including: a guide track having a plurality of electromagnets arranged distributed along the guide track; at least one carrier that is guided by and movable along the guide track and that includes a drive magnet for cooperating with the electromagnets of the guide track to move the carrier; and a control device for controlling the movement of the carrier relative to the guide track by a corresponding control of the electromagnets, wherein the control device is configured to detect an inertial response of the moving mass of the carrier during a movement of the carrier and to determine mass information relating to the mass of the carrier on the basis of the inertial response.

13 Claims, 4 Drawing Sheets

(56) References Cited

U.S. PATENT DOCUMENTS

| | | | | |
|---|---|---|---|---|
| 10,773,232 B2 * | 9/2020 | Banyai | ................ | B01J 19/0046 |
| 10,773,847 B2 * | 9/2020 | Bellante | ................ | B65B 57/08 |
| 2003/0230941 A1 | 12/2003 | Jacobs | | |
| 2005/0034538 A1 | 2/2005 | Rehm et al. | | |
| 2016/0146891 A1 | 5/2016 | Prussmeier et al. | | |
| 2019/0061558 A1 | 2/2019 | Craver | | |

FOREIGN PATENT DOCUMENTS

| | | | | | |
|---|---|---|---|---|---|
| WO | WO 2018/049102 A1 | 3/2018 | | | |
| WO | 2019238277 | * | 2/2019 | ............. | B65G 54/02 |

* cited by examiner

LINEAR MOTOR SYSTEM AND OPERATING METHOD FOR THE SAME

The present invention relates to a linear motor system, in particular to a transport system, e.g. a multi-carrier, comprising: a guide track having a plurality of electromagnets arranged distributed along the guide track; at least one carrier that is guided by and movable along the guide track and that comprises a drive magnet for cooperating with the electromagnets of the guide track to move the carrier; and a control device for controlling the movement of the carrier relative to the guide track by a corresponding control of the electromagnets. The invention also relates to a method of operating such a system.

Linear motors are widely used today. They can, for example, be used to move products in industrial plants, in particular to transport them. Multi-carriers are particularly advantageous for the flexible transport of the most varied products. They in particular comprise a plurality of carriers, that is transport units, that can be moved individually and independently of one another. In a typical multi-carrier system, the guide track is closed in itself, i.e. it is practically endless, which enables a revolving operation.

For example, it is frequently necessary in industrial plants to determine the mass of a product or a product quantity, for instance, on the filling of products in a predetermined number or quantity. For this purpose, scales are typically used, that is specific apparatus that are designed for the weight determination and that comprise a mechanical system and a sensor system for determining the mass.

It is an object of the invention to determine the mass of a carrier in a linear motor system of the initially mentioned kind and/or of an object arranged at the carrier in a particularly simple manner.

This object is satisfied by a linear motor system in accordance with claim 1, and in particular in that the control device is configured to detect an inertial response of the moving mass of the carrier during a movement of the carrier and to determine mass information on the mass of the carrier on the basis of the inertial response.

The invention therefore uses the inertia of the mass during a movement to determine the mass information. The mass information determined in this way initially relates to the carrier itself and to any objects transported by the carrier. The inertial response can in particular comprise a force, a change in position and/or a change in location, and/or a deviation of an actual value from a desired value, said deviation being determined for the movement of the carrier by the control device. Thus, the mass information can be determined in a simple manner, typically by devices that the linear motor system anyway has, without having to provide additional sensors.

The inertia of the moving mass, namely of the carrier and possibly of an object moved by the carrier, during a movement of the carrier is, for example, expressed in a more or less strong deviation of feedback information from a desired value, which is defined or calculated in the control device, and/or in a control response of a movement regulation. The control device can therefore, for example, be configured to control the carrier to perform a movement, wherein the control device specifies at least one desired value, for example a desired position value, desired speed value or desired acceleration value, and to determine mass information relating to the mass of the carrier on the basis of a deviation of an actual value from the desired value, said deviation in particular being dependent on the inertia of the moving mass. The invention is therefore generally based on the idea of determining mass information relating to the mass of the carrier while using the inertia of the mass of the carrier during a movement.

In general, the mass information comprises information on the total mass moved by the carrier, i.e. if an object is moved by the carrier, for example because a product lies on or is arranged at the carrier, the mass of this object is initially recorded as well. However, the mass of the carrier without such an object is often known or can also be determined at a point in time at which the object is not present at the carrier. By forming the difference between the determined mass information and the mass information of the mass of the carrier alone, mass information relating to only the mass of the object can be derived.

The mass information can, for example, further generally comprise a mass value, for example in grams. In this respect, the mass of the carrier is ultimately determined directly, if applicable together with that of an object. The carrier thus ultimately acts like a scale. In general, the mass of the carrier and/or of an object moved by the carrier can therefore be determined in a simple manner by the invention, in particular down to a range of a few grams or a few tens of grams. The method in accordance with the invention of determining the mass information may generally not be as accurate as highly accurate industrial scales. Nevertheless, a rough determination of the mass information is also advantageous in many application situations, for example to exactly a few grams, e.g. to exactly 5 grams. This in particular applies to cases in which it is to be determined whether a product is present as a whole or in the correct number at the carrier.

Alternatively or additionally, the mass information can e.g. not comprise a mass value, but can, for example, be associated only with the mass of the carrier, possibly together with that of an object. In many applications, it is, for example, not necessary to determine a mass value. Thus, it can often be sufficient to know whether the inertial response and/or the mass information is within a predefined range or not. Only a difference or a ratio between a first piece of mass information and a second, subsequently determined piece of mass information can, for example, also be determined and further information can be derived from this difference. Both the determination whether the inertial response and/or the mass information is/are within a predefined range or not and the determination of a difference or of a ratio of two pieces of mass information can serve in a simple manner to determine whether an object, in particular a product, is present at the carrier or not, possibly in the provided number and/or quantity.

Linear motor systems of the initially mentioned kind typically comprise an information feedback device for returning at least one piece of feedback information on the movement of the carrier and/or on the activity of the electromagnets during a movement of the carrier to the control device.

An exemplary information feedback device comprises a position detection device. Such a device can, for example, be configured as an incremental encoder or as an absolute encoder. The position detection device can preferably work in a magnetic manner. For example, the carrier can comprise a position magnet, wherein a plurality of magnetic sensors can be arranged along the guide track. Alternatively or additionally, an optical position detection device can also be provided, for example.

Furthermore, the control device of a linear motor system of the initially mentioned kind is typically configured to regulate the movement of the carrier, in particular on the basis of the feedback information. This allows a precise movement of the carrier along the guide track. For example, a speed regulation, a position regulation, an acceleration regulation, a current regulation, and/or a force regulation can be provided.

The invention now in particular advantageously uses this information feedback and/or a regulation that is typically anyway present to determine the mass of the carrier in a simple manner. Thus, the control device can be configured to determine mass information relating to the mass of the carrier on the basis of a control deviation and/or a control response. In other words, the inertial response can be or comprise a control deviation and/or a control response. The mass information can in particular be determined on the basis of a contour error.

The determination of mass information without additional hardware, in particular without an additional sensor, and without an additional mechanical system is thus possible through the invention. The invention rather in particular uses the sensor system, which is typically anyway present at a linear motor system, and can otherwise only be implemented in software. The "weighing" function can therefore be easily integrated into the linear motor system by the invention and can even be retrofitted at existing systems in a particularly simple manner via a software update. The carrier thus ultimately forms a mass determination device, which is in particular independent of position with respect to the guide track, for an object moved by the carrier. In addition to the carriers, no other mass determination device, such as a scale, a piezo encoder or similar, is generally necessary or present if such a device can additionally also be provided in the specific system.

The inertial response is preferably detected, in particular solely detected, in the longitudinal direction with respect to the guide track and the mass information is determined on the basis of this inertial response. The inertial response can in particular be detected on the basis of a position, a speed and/or an acceleration of the carrier, which is detected by a position detection system, along the guide track or the direction of movement along the guide track. The inertial response in the longitudinal direction can in particular take place and be detected during an acceleration of the carrier in the longitudinal direction. The acceleration can in this respect generally be positive or negative.

The movement of the carrier during which the inertial response is detected can generally be a normal and desired movement, namely forward and/or backward along the guide track. The normal movement is thus advantageously used to determine the mass information since in this respect an inertial response likewise occurs in the longitudinal direction of the guide track and oppositely to the acceleration of the carrier. Typically, a movement of the carrier is essentially only possible in one dimension at a linear motor system, namely along the guide track, but typically in both opposite directions along the guide track.

Insofar as the control device is also configured to regulate the movement of the carrier, this regulation therefore in particular relates to the longitudinal direction of the guide track. In relation thereto, for instance, the position, the speed, and/or the acceleration of the carrier, and/or the force exerted by the electromagnets on the carrier can be regulated.

However, an inertial response can, for example, also be detected with respect to another spatial direction, for example transverse to the guide track, and can serve as the basis for determining the mass information. In this connection, the guide track can, for example, comprise a curve and an inertial response transverse to the guide track can be detected during a movement of the carrier in the curve. This inertial response takes place since the mass of the carrier urges outwardly centrifugally during the curve. Mass information can also be determined on the basis of such an inertial response. In the simplest case, the movement takes place at a constant speed during the detection of the inertial response, but it can generally have any desired speed profile.

A further advantage of the invention is that the mass information can be determined independently of the orientation in which the linear motor system and/or the carrier is/are arranged in space and of the orientation in which the object moved by the carrier is arranged with respect to the carrier. This is because the inertial response results solely from the movement of the carrier, possibly together with a further object. Common mass determination devices, such as scales, in contrast only work with respect to the direction of gravity, i.e. vertically.

In accordance with an embodiment, provision is made that the inertial response is detected on the basis of a position of the carrier relative to the guide track, in particular a position along the guide track. The position of the carrier can, for example, be feedback information. A position detection device is often anyway present at a linear motor system so that this sensor system that is anyway present can be used and no further sensors are necessary. In addition, position detection devices for linear motor systems are available with a high accuracy and in large numbers.

Alternatively or additionally, the inertial response can, for example, be detected on the basis of a coil current of at least one of the electromagnets. Such a coil current can, for example, be derived in a simple manner from a control response, but can e.g. also be measured. The coil current can, for example—at a given desired acceleration—, be larger with a higher mass than with a smaller mass to be moved.

In an advantageous embodiment, the control device is configured to determine product information relating to a product to be moved by the carrier, in particular mass information relating to the mass of the product and/or a number of products or product parts, on the basis of the mass information. The product information can, for example, comprise information on the presence of the product, possibly in a provided number and/or quantity. However, the product information can, for example, also comprise a mass value of the product, for example in grams. Mass information relating to the mass of the product can, for example, be determined by subtracting previously known or previously determined mass information relating to the mass of the carrier without a product from determined mass information relating to the mass of the carrier with a product. Ultimately, a great deal of information relating to the product can therefore be derived via the mass information. This information can, for example, be advantageously used as part of a process control, for instance in a filling plant or a sorting plant, in order to improve the process.

The control device can, for example, be configured to control the carrier to perform a mass determination movement, to detect an inertial response during the mass determination movement, in particular through feedback information, to detect a control deviation and/or a control response, and to determine the mass information on the basis of said inertial response. A pure mass determination movement is meant by the term "mass determination movement". The movement therefore so-to-say only takes place for the purpose of determining the mass information. A mass determination movement typically starts from a starting point and also comprises a return to the starting point. This starting point is in particular a position at which a feed or a discharge of the product to or from the carrier is provided.

The mass information can generally, however, be determined in any desired movement, in particular also during a movement that should anyway be performed as part of the application of the linear motor system.

Furthermore, during a movement along a path that is anyway provided, a movement profile of the movement can have a mass determination profile, that is a particular deviation from a normal movement, wherein the mass determination profile can, for example, be optimized with respect to a high accuracy of the mass determination.

In general, a movement during which an inertial response or mass information is determined or a movement profile can, for example, comprise a speed profile that is at least partly or at least substantially linearly of ramp shape, sawtooth shape, or sinusoidal shape.

The mass information can, for example, be determinable in at least one mass determination section with respect to the guide track. In accordance with a preferred embodiment, provision is made that the mass determination section can be selected and in particular the selection can be changed. This allows a flexible use of the linear motor system for determining the mass information. One or more mass determination sections can in particular be freely selectable and/or freely definable.

In a further development, the linear motor system comprises an interface for outputting the mass information. The interface can, for example, be a bus interface. The interface can, for example, be configured to output the mass information to a user device. For example, industrial systems having a linear motor system as the transport system frequently comprise a large number of different devices that each form a user device here. Furthermore, a process control system can also form a user device in this sense. The mass information can be acquired by the process control system and the various devices of the industrial system can be controlled on the basis of the information.

Alternatively or additionally, the linear motor system can comprise an interface for inputting data and/or commands by a user and/or by a user device. Via the interface, the user can, for example, be enabled to input at least one limit value or range for the mass information. The linear motor system can, for example, determine error information on the basis of this input. A section of the guide track in which the mass information is determined and is in particular compared with a certain limit value or range can also be selectable via the interface, for example.

The control device preferably comprises a control library, i.e., for example, a software library that is present or used in the control device and that provides functions for calculating the mass information from the inertial response. Only one mass value or piece of information on the presence of a product, possibly in the correct quantity and/or number, can then be output via an interface. Error information can also be output. These measures enable the simple use of the mass information by the user.

With further advantage, the linear motor system can, for example, comprise a plurality of carriers that are in particular movable independently of one another. The mass information can in particular be (separately) determinable for all the carriers. Furthermore, a coordinated mass determination of two connected and/or jointly moved carriers can also be possible, for example. This can, for example, be useful when two carriers jointly move, in particular transport, an object, for example, a product or a container.

The carrier or carriers can preferably be mechanically guided at the guide track, in particular by a roller guide.

The object is also satisfied by a method in accordance with the independent claim directed thereto. This method serves the operation of a linear motor system that comprises: a guide track having a plurality of electromagnets arranged distributed along the guide track; at least one carrier that is guided by and movable along the guide track and that comprises a drive magnet for cooperating with the electromagnets of the guide track to move the carrier; and a control device for controlling the movement of the carrier relative to the guide track by a corresponding control of the electromagnets. The method further comprises detecting an inertial response of the moving mass of the carrier during a movement of the carrier and determining mass information relating to the mass of the carrier on the basis of the inertial response.

In an embodiment, provision is made that a first piece of mass information is determined during a first movement, wherein a second piece of mass information is determined during a second movement of the same carrier. A product can in this respect preferably be fed to the carrier or discharged from the carrier between the movements. Thus, mass information relating to the product can, for example, be determined in a simple manner by comparing the first piece of mass information with the second piece of mass information. It can, for example, also be determined whether the product was actually fed or discharged, possibly in the correct quantity. The feed or discharge can, for example, take place at a standstill. However, it can generally also take place during a movement. The first movement and the second movement are therefore not necessarily separated from one another by an intermediate standstill.

In accordance with a further development, provision is made that a difference between two pieces of mass information, in particular between the first piece of mass information and the second piece of mass information, is determined. On the basis of the difference, a wide variety of information can be derived in a total system, for instance information on whether a product is present or not.

A control of the linear motor system can, for example, take place on the basis of the mass information and/or the difference. Thus, on the basis thereof, a certain position can, for example, be approached, a maximum current or a maximum acceleration can be changed, a power planning of the electrical power of the electromagnets can be performed or similar. Further components, in particular user devices, can, for example, be controlled on the basis of the mass information or information derived therefrom.

Provision can, for example, also be made that the mass information and/or a difference between two pieces of mass information, in particular two determined pieces of mass information, is compared with a desired value and/or a desired range. Error information can in particular be determined based on the comparison. If an error is present, the linear motor system can, for example, be controlled such that the carrier moves back to a feed device or a discharge device. The error can then, for example, be corrected there by feeding or discharging a further quantity or number of products. In general, the error can, for example, be corrected by an automatic feed device, discharge device, or correction device. Alternatively, it is, for example, possible to mark a carrier as faulty and to initiate a manual correction.

The error information can, for example, comprise information as to whether a product is present at the carrier in the provided number and/or mass or not. In this respect, a tolerance range for the mass information can, for example, be defined, e.g. it can be predefined by the user.

In an advantageous embodiment, the mass information is monitored in a plurality of sections of the linear motor system with respect to the guide track. Thus, changes in the mass information can be easily determined and error information can be derived if these changes do not correspond to a desired change in the mass of the object moved by the carrier. A monitoring can preferably be provided over the total provided movement path of the carrier. Furthermore, a monitoring of the mass information can also be provided for a plurality of carriers. Ultimately, a monitoring, in particular a comprehensive and/or a permanent monitoring, of the mass information of all the carriers can thus be implemented over the total movement path of the linear motor system. Processes in which such a linear motor system is used can hereby be better controlled and a plurality of sensors and separate process steps for mass determination can be saved.

An exemplary application of the method in accordance with the invention or of the linear motor system in accordance with the invention is, for example, a filling system, for instance for filling a bulk material or a liquid into a container. In this respect, the linear motor system can, for example, be used to position the container at a feed device and/or to transport the container. The mass of the container or of the bulk material or of the liquid can here be determined in a simple manner by the invention, in particular without the container having to be transferred to a separate scale in the meantime.

A further exemplary application is a sorting system, for example comprising a pick-and-place robot. The linear motor system here likewise serves to position the carrier, namely relative to the robot. The robot grips a product and places it at the carrier, if necessary in a container that is located on the carrier or at the carrier. This is in particular repeated until a predetermined number of products are present at the carrier or the container. The carrier can, for example, subsequently transport the products or the container away. The determination in accordance with the invention of the mass information can, for example, advantageously be used here to determine whether the steps performed by the robot were successful, that is whether the robot has actually placed the predetermined number of products at the carrier or in the container. To determine this, the mass information is determined during a movement of the carrier. If the mass information lies in a predetermined expectation range, it can be assumed that the steps performed by the robot were successful. If this is not the case, this can, for example, indicate that one or more products were not placed at the carrier as planned, for example because the robot lost the product elsewhere or did not grip it properly in the first place.

In general, an object moved by the carrier can, for example, be a product, a quantity or number of products, and/or a container or other carrier, e.g. for a quantity or number of products.

It is understood that the methods described herein can also be further developed in the sense of the individual features and embodiments described with respect to the apparatus, that is in particular the linear motor system and the transport system, and vice versa.

The invention will be explained only by way of example in the following with reference to the schematic drawings.

Figure 1:
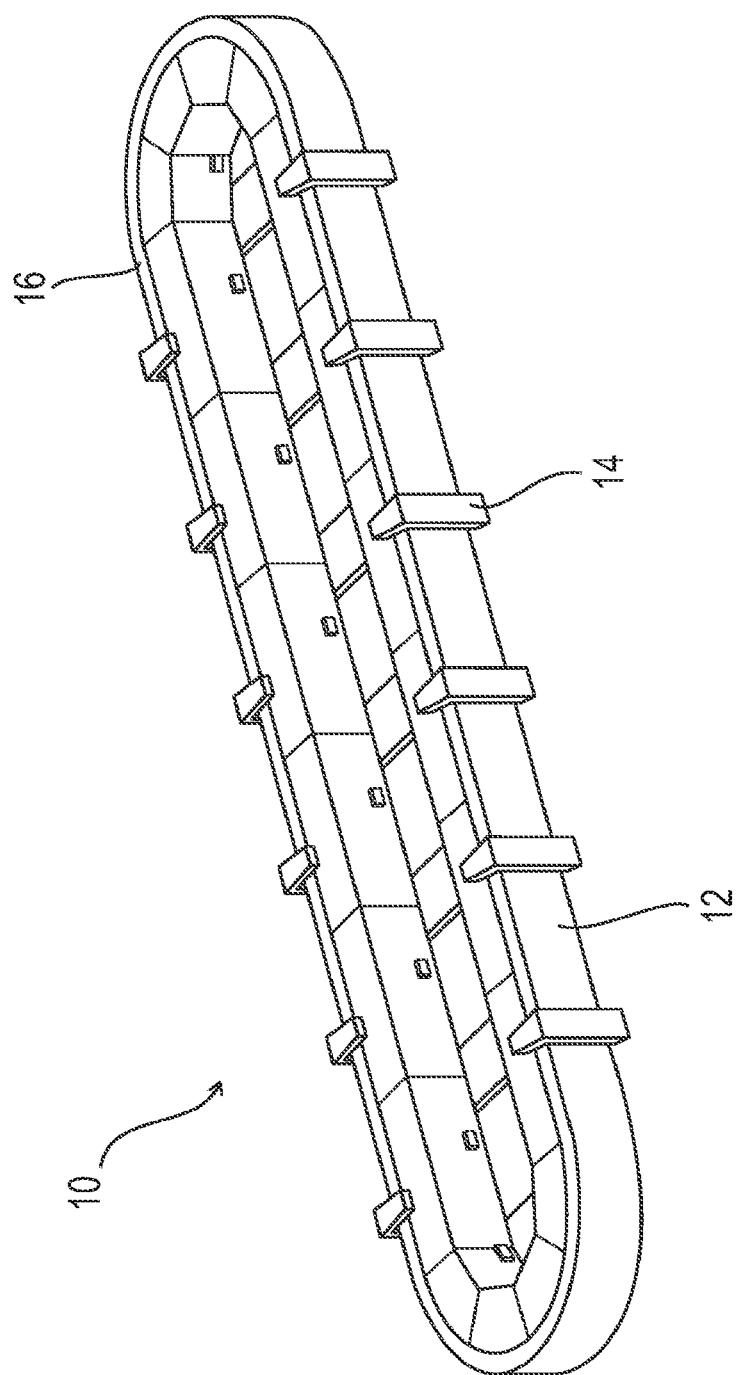
FIG. 1 shows a linear motor system configured as a transport system.

A transport system 10 in accordance with the invention, which is configured as a multi-carrier system, is shown in FIG. 1. The transport system 10 comprises a plurality of linear motors 12 that are arranged in rows such that a continuous and in this case revolving movement of the carriers 14 along a guide track 16 is made possible. The transport system 10 further comprises a plurality of carriers 14 that form individual transport elements of the transport system 10 and that can be moved along the guide track 16, in particular independently of one another, by means of the linear motors 12.

Figure 2:
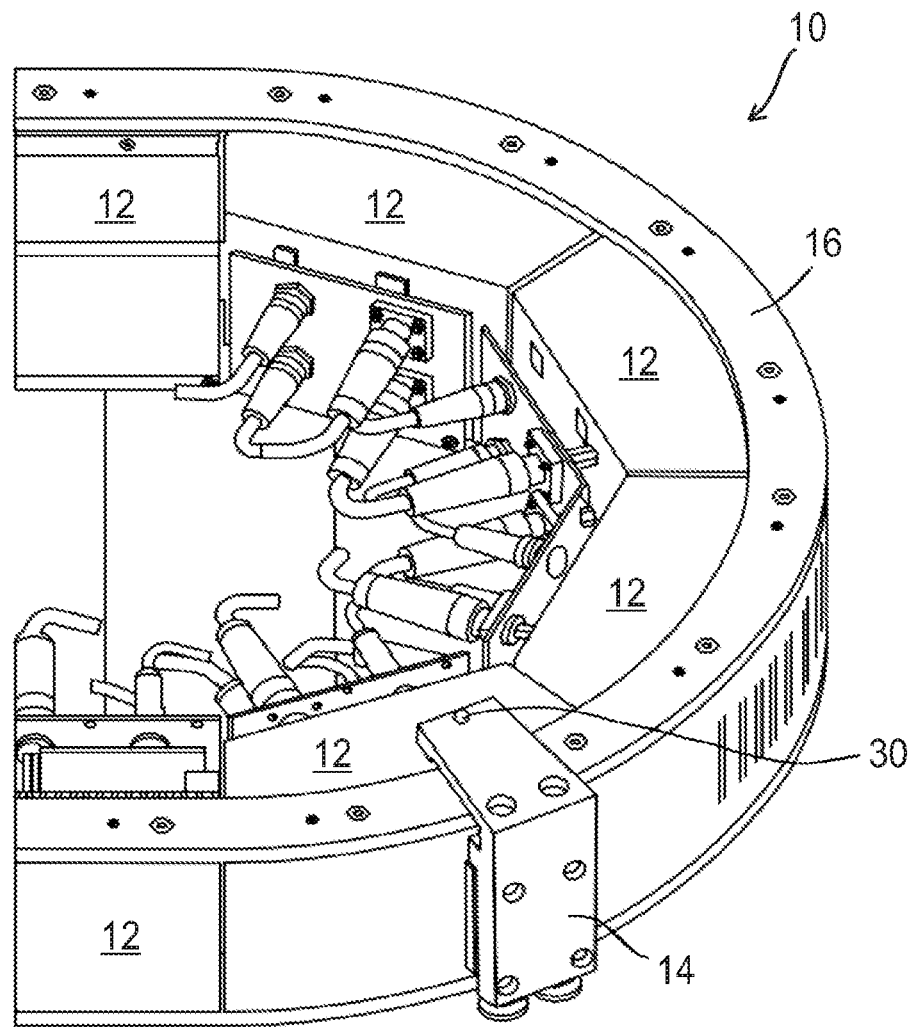
FIG. 2 shows a curve section of the transport system of FIG. 1.

FIG. 2 shows a curve section of the transport system 10 in an enlarged view. Only one carrier 14 is shown here, which is movable along the guide track 16, namely via the linear motors 12. Different electronic devices for controlling the linear motors 12 are visible at the side of the guide track 16 remote from the carrier 14, that is within the curve.

Figure 3:
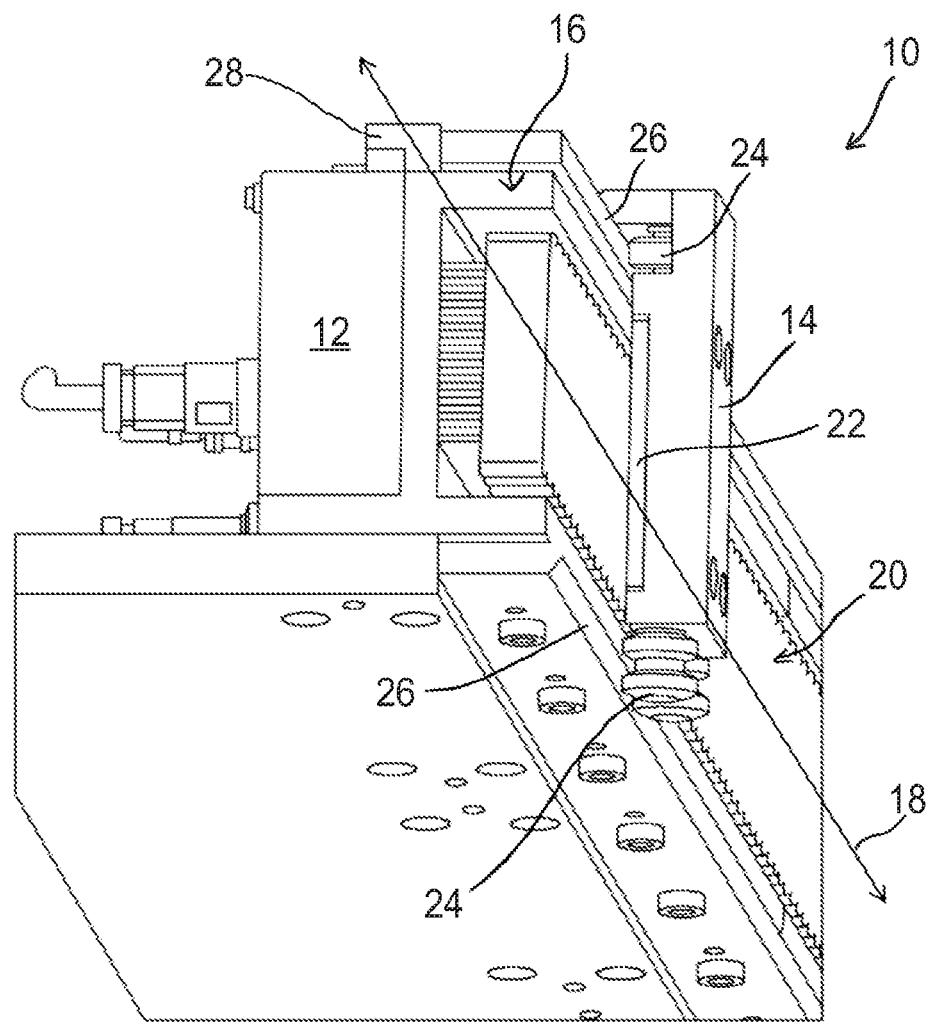
FIG. 3 shows a cross-section of the transport system of FIG. 1 with a sectional plane perpendicular to a guide track.

In FIG. 3, the transport system 10 is shown in a sectional view and enlarged. A carrier 14 is visible that is movably guided at the guide track 16. In this respect, the carrier 14 is movable along a guide axis 18 or a movement axis. For a movement along the guide axis 18, the carrier 14 is controlled by a plurality of electromagnets 20 that are arranged at the guide track 16 and that are uniformly distributed along it. The electromagnets 20 in this respect cooperate with a permanent magnet 22, which is arranged at the carrier 14 and which can also be designated as a drive magnet, for driving the carrier.

The carrier 14 is mechanically guided at the guide track 16, namely by a roller guide. Said roller guide comprises guide rollers 24 at the carrier 14 and guide rails 26 at the guide track 16. The carrier 14 is in this respect in particular held at the guide track 16 via the permanent magnet 22.

The transport system 10 furthermore comprises a position detection device 28. Said position detection device can, for example, be formed as a series of a plurality of magnetic sensors that extends along the guide track 16. A permanent magnet 30, which can also be designated as a position magnet and which is visible in FIG. 2, can be provided at the carrier 14, for example.

The transport system 10 furthermore comprises a control device that is not shown separately and that is configured to control the electromagnets 20 in a targeted manner in order to move the carrier 14 along the guide track 16 or the guide axis 18. In this respect, the position detection device 28 returns position information relating to the position of the carrier 14 with respect to the guide axis 18 to the control device. The control device regulates the movement of the carrier 14 on the basis of the position information.

When the carrier 14 is moved, an inertial response generally results. It can here be detected in a simple manner by the control device since an inertial response is expressed during an acceleration along the guide track 16 as part of the movement regulation. Thus, a control deviation and/or a control response is/are in particular dependent on the inertia. The inertial response is in this respect dependent on the moving mass. A control deviation can, for example, be easily detected by the position detection system. A control response, for example, results from an output value of a regulator of the control device, in particular from a coil current for at least one electromagnet.

If the mass is small, the control deviation is small and/or a control response is not particularly strong. If, in contrast, the mass is large, the control deviation and/or the control response is strong. Within the framework of the invention, this relationship is advantageously used to determine mass information relating to the mass of the carrier and/or to the mass of an object moved by the carrier. In this respect, it is often not even necessary to determine a certain or even an exact mass value. Rather, a particularly simple implementation comprises determining whether or not an object to be moved by the carrier 14 is present at the carrier, possibly in the correct number or quantity.

Figure 4:
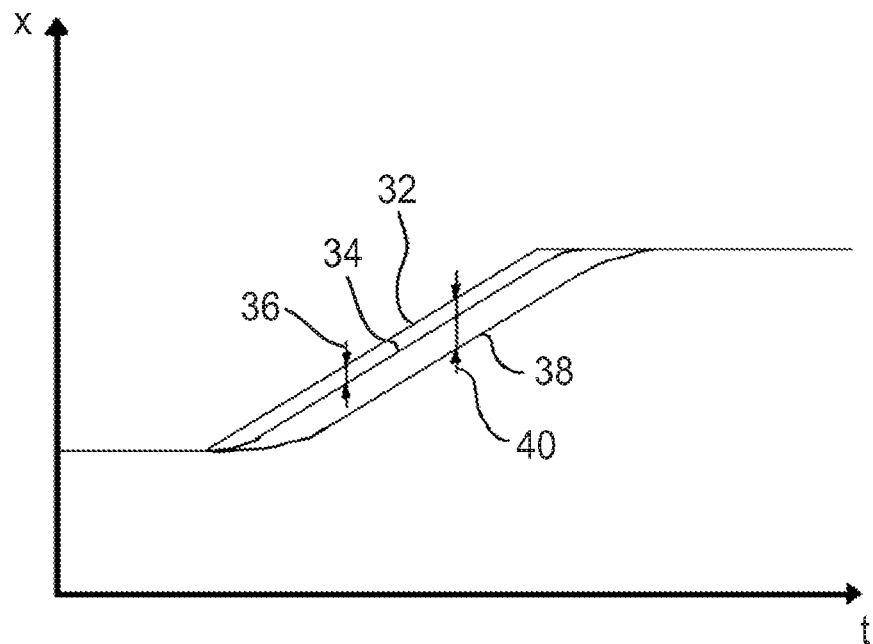
FIG. 4 shows a plotting of different movement paths of a carrier.

FIG. 4 shows a plotting of different movement paths of a carrier, wherein the abscissa represents the time and is designated as t, and wherein the ordinate represents the position of the carrier with respect to the guide track and is designated as x. The x direction thus corresponds to the guide axis 18 marked in FIG. 3.

A desired movement path 32 of an exemplary, regulated mass determination movement is shown. In this respect, the carrier is moved from a first position at a constant speed to a second position that differs from the first position.

An actual movement path 34 of a carrier is additionally shown. It has a control deviation 36 from the desired movement path 32 that is formed as a contour error here. A further actual movement path 38 of a carrier likewise has a control deviation 40 with respect to the desired movement path 32.

Mass information relating to the moving carrier can be determined based on a control deviation 36 or 40 since the control deviation is an inertial response of the system. The greater the control deviation 36 or 40, the greater the moving mass of the carrier. Based on the difference of the control deviations 36 and 40, it is also possible to conclude a difference of the moving masses of the respective carriers. If the movement paths shown relate to a certain carrier, an unloaded state and a loaded state of the carrier can, for example, be differentiated based on a difference in the control deviations 36 and 40. In this respect, the movement path 34 would correspond to the unloaded state and the movement path 38 would correspond to the loaded state.

The desired movement path 32 shown can, for example, represent a movement of the carrier which is anyway provided and during which the mass determination can be performed.

REFERENCE NUMERAL LIST 10 transport system
12 linear motor
14 carrier
16 guide track
18 guide axis
20 electromagnets
22 drive magnet
24 guide rollers
26 guide rail
28 position detection device
30 position magnet
32 desired movement path
34 movement path
36 control deviation
38 movement path
40 control deviation

The invention claimed is:

1. A linear motor system, comprising:
a guide track having a plurality of electromagnets arranged distributed along the guide track;
at least one carrier that is guided by and movable along the guide track and that comprises a drive magnet for cooperating with the electromagnets of the guide track to move the carrier; and
a control device for controlling the movement of the carrier relative to the guide track by a corresponding control of the electromagnets,
wherein the control device is configured to detect an inertial response of the moving mass of the carrier during a movement of the carrier and to determine mass information relating to the mass of the carrier on the basis of the inertial response, and
the control device is configured to control the carrier to perform a mass determination movement, to detect an inertial response during the mass determination movement, through feedback information, and to determine the mass information on the basis of said inertial response.

2. The linear motor system in accordance with claim 1, wherein the linear motor system comprises an information feedback device for returning at least one piece of feedback information, which relates to the movement of the carrier and/or to the activity of the electromagnets during a movement of the carrier, to the control device.

3. The linear motor system in accordance with claim 2, wherein the control device is configured to regulate the movement of the carrier, on the basis of the feedback information, and to determine the mass information on the basis of a control deviation and/or a control response.

4. The linear motor system in accordance with claim 1, wherein the inertial response is detected on the basis of a position of the carrier relative to the guide track, including a position along the guide track.

5. The linear motor system in accordance with claim 1, wherein the control device is configured to determine product information relating to a product to be moved by the carrier, relating to the mass of the product and/or a number of products or product parts, on the basis of the mass information.

6. The linear motor system in accordance with claim 1, wherein the mass information can be determined in at least one mass determination section with respect to the guide track, and wherein the mass determination section can be selected and a selection can be changed.

7. The linear motor system in accordance with claim 1, wherein the linear motor system comprises an interface for outputting the mass information, to a user device, and/or for inputting data and/or commands by a user and/or a user device.

8. A method of operating the linear motor system in accordance with claim 1,
wherein the linear motor system comprises:
a guide track having a plurality of electromagnets arranged distributed along the guide track;
at least one carrier that is guided by and movable along the guide track and that comprises a drive magnet for cooperating with the electromagnets of the guide track to move the carrier; and
a control device for controlling the movement of the carrier relative to the guide track by a corresponding control of the electromagnets, wherein the method comprises
detecting an inertial response of the moving mass of the carrier during a movement of the carrier and determining mass information relating to the mass of the carrier on the basis of the inertial response,
wherein a first piece of mass information is determined during a first movement, and wherein a second piece of mass information is determined during a second movement, and
wherein a product is fed to the carrier or is discharged from the carrier between the movements.

9. The method in accordance with claim 8,
wherein a difference of the mass information is determined.

10. The method in accordance with claim 8,
wherein the mass information and/or a difference between two determined pieces of mass information, is compared with a desired value and/or a desired range.

11. The method in accordance with claim 10,
wherein error information is determined on the basis of the comparison,
wherein the error information comprises information as to whether a product is present at the carrier in the provided number and/or mass or not.

12. The method in accordance with claim 8,
wherein the mass information is monitored in a plurality of sections of the linear motor system with respect to the guide track, over the total provided movement path of the carrier.

13. A linear motor system, comprising:
a guide track having a plurality of electromagnets arranged distributed along the guide track;
at least one carrier that is guided by and movable along the guide track and that comprises a drive magnet for cooperating with the electromagnets of the guide track to move the carrier; and
a control device for controlling the movement of the carrier relative to the guide track by a corresponding control of the electromagnets,
wherein the control device is configured to detect an inertial response of the moving mass of the carrier during a movement of the carrier and to determine mass information relating to the mass of the carrier on the basis of the inertial response, and
the inertial response is detected on the basis of a coil current of one of the electromagnets.

* * * * *